May 8, 1956   T. E. WHITEHEAD   2,744,786
DISAPPEARING LAWN SPRINKLERS
Filed May 25, 1955   2 Sheets-Sheet 2
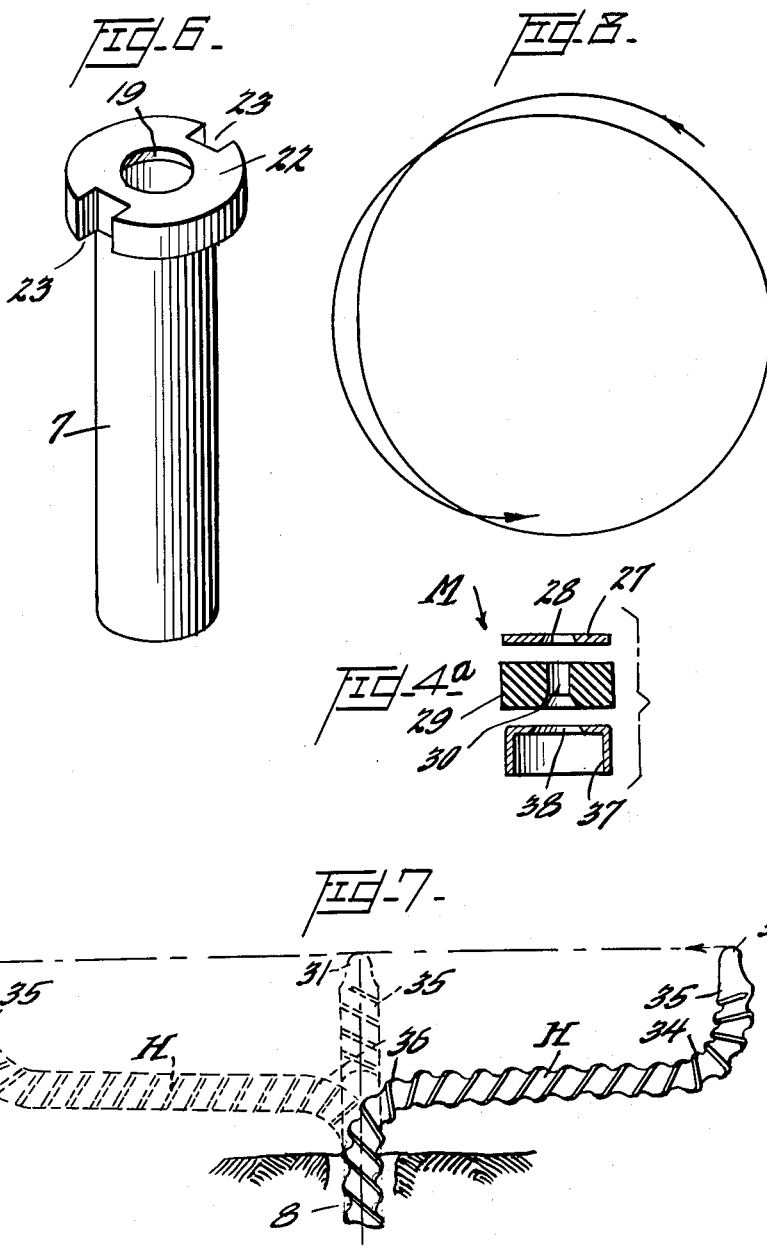
INVENTOR
*Thomas E. Whitehead,*
BY *Parker Cook*
ATTORNEY

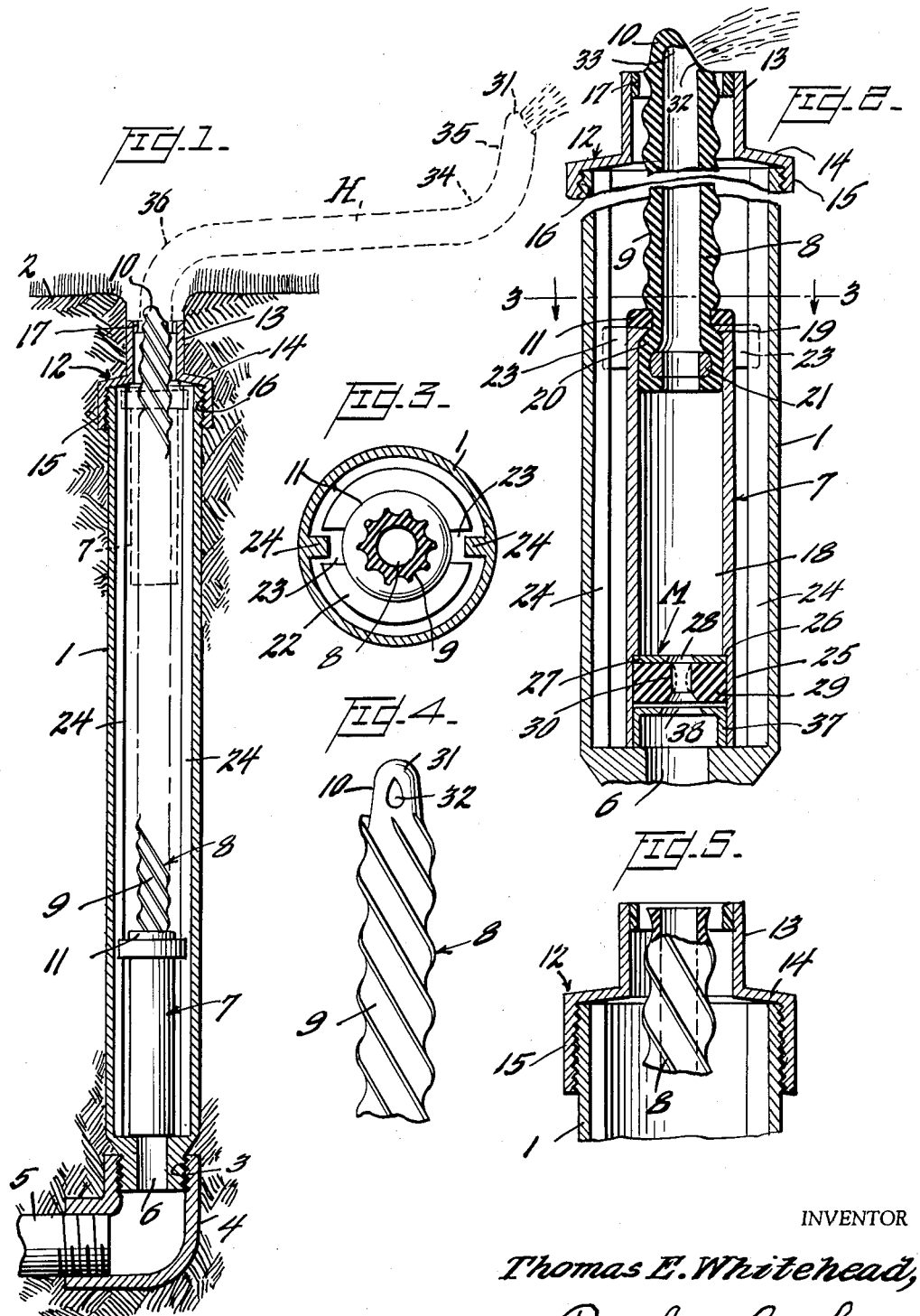

United States Patent Office 2,744,786
Patented May 8, 1956

---

2,744,786

DISAPPEARING LAWN SPRINKLERS

Thomas E. Whitehead, Pleasantville, N. J.

Application May 25, 1955, Serial No. 511,030

2 Claims. (Cl. 299—61)

My invention relates to new and useful improvements in lawn sprinklers, the present application being a "continuation in part" of an application filed by me on March 4, 1954, bearing Serial Number 414,147.

The parental application related to a sprinkler that was to be permanently buried in the ground, the sprinkler having a spiralled-grooved small rubber flexible tube that was projected and retracted through the sod so that when the water was turned off this rubber tube, which was weighted at its lower end, would sink within its housing and thereby not deflect a golf ball if the sprinkler were used on a golf green.

The present application includes the weighted rubber flexible tube with a plurality of spiral grooves around its circumference, as in the former case; and it also includes a way of restricting the outer end of the tube and forming an opening slightly below the restriction and tangent to the bore, together with a water meter enclosed in the weighted end of the tube, so that the tube instead of making a full revolution, as in the parental case, may be limited in its swing from 90° to 220°, depending upon the flow of water through the tube. This is desirable as oftentimes the sprinkler is to be placed up against the wall of a house, and it is not desirable to have the water thrown over against the house; or, the sprinkler may be used near the curbline of the sidewalk and it is not desired to sprinkle the sidewalk.

Another object of the invention is to provide what might be termed a "disappearing sprinkler," that is, the tube from which the water is forced will automatically drop back in its casing (the casing is below the surface of the lawn) when the water is turned off; and in addition, the horizontal arc through which the tube will swing will be regulated by a water meter so that the tube may be designed to swing through an arc from say 90° to 220°.

Still another object of the invention is to provide a lawn sprinkler wherein the horizontal arc may be predetermined by the use of a water meter, and means being provided in the casing and in the weighted retractable tube so that there is no possibility of the tube revolving within its casing when water is forced through the sprinkler.

Still another object of the invention is to provide a pear-shaped opening just below the restricted end of the tube so that the water passing through the elongated portion of the pear-shaped opening will be a finer spray than that which passes through the larger diameter of the pear-shaped opening.

Still another object of the invention is to provide a simple and inexpensive sprinkler, wherein the casing of the tube may be permanently buried in the ground and the tube when in a retracted position will be beneath the surface of the ground or lawn, so that it offers no obstacle to a lawn mower; or, if used on a baseball field or other similar field, it would offer no obstruction or hazard to the players.

Still another object of the invention is to provide a sprinkler wherein the horizontal arc may be predetermined so that the spray may be directed through an arc of anywheres from 90° to 220° in the desired direction.

Still another object of the invention is to provide a metering device in the weighted end of the flexible tube so that if a tube is used with a restricted end and an opening at its side, the size of the arc may be predetermined; and also to provide a metering device in the tube that does not have a restricted end (as shown in the parental application) so that the other characteristics of the spray will not be affected by any change in the pressure of the water before it enters the sprinkler.

With these and other objects in view, the invention consists in certain new and novel arrangements and combinations of parts as will hereinafter be more fully described and pointed out in the claims.

Referring now to the drawings, showing a preferred and one modified form,

Fig. 1 is a vertical section through the casing of the sprinkler, showing the tube and its piston in its restricted position, the dotted lines showing the tube in its protracted or sprinkling position.

Fig. 2 is a similar enlarged vertical section, showing in detail the piston and its metering device as well as the restricted end of the tube, Fig. 3 is a section taken on line 3—3 of Fig. 2, Fig. 4 is a detailed view of the upper end of the flexible tube and showing the pear-shaped opening extending at an angle to the vertical axis of the tube, Fig. 4a is an exploded view of the metering device, Fig. 5 is a fragmentary detailed view showing a modified form of the tube, that is, with the tube not restricted at its outer end, Fig. 6 is a perspective of the piston showing the means for preventing it from turning when in its casing, Fig. 7 is a view showing the arc in which the flexible tube may swing, depending upon the flow of water through the piston and metering device, and Fig. 8 is a diagrammatic view showing the path through which the tube will swing if its end is not restricted as in the preferred form.

Referring now more particularly to the several views and to Figs. 1 and 2 for the moment, it will be understood that the sprinkler generally follows the parental application with the exception that there is a metering device in the piston at the lower end of the tube so that the tube will swing only through half of a circle, or slightly greater than half, when the tube is restricted at its outer end, as will be mentioned, and the opening is not co-axial with the central passageway but at an angle thereto.

It will be understood that the casing 1 is to be buried permanently beneath the level of the sod 2 and that the lower end of the casing 1 is externally threaded as at 3, to which is connected a nipple 4 into which in turn leads the inlet pipe or water supply 5. The lower end of the casing 1 is also provided with a central bore 6 so that water may enter the casing 1 and raise the piston 7 to which is connected, that is, at its upper end, the flexible rubber tube 8 which is provided with the spiral grooves 9 which terminate just short of the tube's upper end 10, as may be seen in Fig. 4.

There is a rubber gasket 11 on the upper surface of the piston 7 so that this rubber gasket 11 when the piston 7 is raised will impinge, or in other words, contact with and form a seal with the internal top of the cap 12, which cap 12 is threaded on the upper end of the casing 1.

Referring now more particularly for the moment to the cap 12, it will be seen that it consists of the tubular portion 13 and the outwardly and downwardly extending flange 14, and is internally threaded at 15 to fit on the externally threaded upper end 16 of the casing 1. The internal diameter at the bottom of the tubular portion 13 is slightly less than the external diameter of the rubber gasket 11, so that when the piston 7 is in its uppermost position the gasket 11 will form a seal about the lower end of the tubular portion 13 of the cap 12; and then, of course, the water will have to pass through the piston 7 and the tube 8, as will be mentioned shortly.

The cap 12 also has a plastic annular ring 17 in its upper end so that as the rubber tube 8 flexes and rotates or reciprocates, it will not become worn.

Reference will now be made to the piston 7 which may best be seen in detail in Fig. 2. It consists of the hollow casing 18 with its upper end 19 internally bevelled around its circumference, and it has the rubber gasket 11, as heretofore mentioned, fitting on the top of the piston 7 and encircling the lower end 20 of the aforementioned tube 8. The tube 8 is then forced within the upper end of the piston 7, there being a ring 21 to force the lower end of the tube 8 tightly against the side walls of the piston 7 so that the tube 8 is held tightly within the upper end of the piston 7.

The piston 7 at its upper end is also provided with a circular flange 22, as seen in detail in Fig. 6, and is provided with oppositely positioned grooves 23 which fit about vertical guides 24 oppositely disposed within the heretofore mentioned casing 1. Thus the piston 7 and the flexible tube 8 can never revolve within the casing 1, which is important as it is to be remembered that the opening or orifice in the outer end of the tube 8 must point outwardly from the casing 1.

Now, in the bottom of the piston 7 I provide a water metering device M which in itself is not new.

It will be noticed that the lower end 25 of the piston 7 is slightly counter-bored to form a ridge or flange 26 in which is placed a small circular washer 27 which is provided with a central aperture 28, while beneath the same there is a flexible rubber ring 29 with a central aperture 30, and spaced slightly below the bottom surface of the rubber ring 29 is a small collar 37 with a central aperture 38; and it is to be noticed that this is spaced slightly below the bottom of the ring 29 so that water passing through the aperture 38 in the collar 37 can also pass to the side of the central aperture 38 in the ring 29 to compress the same; and as the rubber ring 29 is compressed, its central aperture 30 will also be compressed inwardly, or, in other words, restrict the size of the aperture 30 in the rubber ring 29.

Thus, if the water pressure or flow increases, the greater will be the restriction through the rubber ring 29; and as the pressure falls or or decreases, the central opening 30 in the ring 29 will tend to assume its normal position, thus metering or regulating the amount of water and pressure that pass up into the piston 7 and throughout the tube 8.

The size of the aperture 30 and the elasticity of the rubber ring 29 will have to be predetermined, and, of course, different ones may be installed in the bottom of the piston 7, depending on the amount of pressure that is to be supplied to the sprinkler and the desired arc through which it is to swing.

Referring now to one of the principal parts of the invention and which was discovered only after many experiments, I find that if I restrict the upper end 19 of the tube 8 or tie it off as at 31, and then form an orifice 32 at a slight distance below the end, there is a small resultant pocket 33 formed at the end of the tube 8. This orifice 32 extends tangentially or at substantially right angles to the bore of the tube 8. By forming the upper end of the tube 8 as above outlined, the tube 8 assumes certain positions and acts in a way as heretofore mentioned was discovered only after many experiments.

As shown in Fig. 1, in dotted lines, when the water pressure has raised the piston 7 and the tube 8 is fully extended, it assumes a partly horizontal position, as shown at H; then there is a bend at 34 and the outer end of the tube 8 extends nearly vertically as at 35. Of course, there is a bend also at 36 where the tube 8 projects from the casing 1, so that when water pressure is passing through the tube 8 after the bend at 36, the tube 8 assumes a horizontal position at H, then a bend as at 34, and then a nearly vertical position as at 35. Furthermore, the tube 8 instead of making a complete revolution will only pass through a predetermined arc from say 90° to 220°, depending on the regulation of the flow of water in the tube 8.

The orifice 32 is pear-shaped so that the larger amount of water passes through the lower portion; and there will be more of a spray through the upper portion.

I believe the reasons for the deflections in what might be termed this "half-spray" tube are as follows: Since the orifice 32 is on the side of the tube 8 rather than in line with the internal bore of the tube, when water under pressure flows through the tube a force is exerted against the end of the tube above the orifice 32. This force, acting against the end of the tube 8, that is, against the upper wall of the pocket 33, in line with the axis of the tube's bore, tends to elongate or stretch the tube along its length.

The side of the tube 8 through which this orifice 32 passes is not subjected to this elongating stress since the orifice 32 itself breaks the continuity between the end of the tube 8 where the force is acting and the other end of the tube anchored in the hollow weight. However, the opposite side of the tube 8, that is, from the orifice 32, is subjected to these full stresses and thus becomes elongated or stretched. The stretching of one side of the tube 8 while the other side remains unstretched causes the tube 8 to bend with the unstretched side becoming the shorter radius and the side of the tube 8 directly opposite the orifice 32, where the stretching is the greatest, becomes the longest radius. This bending is thus always towards the side of the tube 8 through which the orifice 32 is formed. The bending of the tube 8 due to these elongating stresses is limited to the lower portion of the tube above the cap 12 due to opposite forces developed at the orifice 32.

The water in leaving the side orifice 32 of the tube 8 exerts a reactive force against the tube itself. This force is in the opposite direction to that of the emitted water. This reactive force at the orifice 32 tends to bend the tube 8 in an opposite direction to that caused by the elongating stresses.

Now, as to why the tube 8 assumes a horizontal position near the bottom of the tube away from the orifice 32, the elongating stresses predominate so that just above the cap 12, the tube 8 begins to bend towards the orifice side through an angle slightly less than 90° until near the middle portion of the length of the tube the two counter-forces are equal and the tube becomes approximately horizontal. Near the orifice end the jet reactive force predominates and the tube 8 is bent through an angle of approximately 90° to an angle opposite the bottom bend. This brings the central bore axis of the end of the tube 8 back into nearly a vertical position before the two forces become equal and opposite.

As a result of these two deflections, the axis of the tube 8 near the orifice end is nearly parallel with the central axis of the casing, but slightly offset. The water or spray is thus directed slightly upwardly and away from the casing of the sprinkler. Simultaneously, the spiralling of the tube walls under the water pressure creates a torque about the central axis of the casing; and with the center of the casing as the pivotal point, this torque swings the deflected tube 8 back and forth through a horizontal arc up to 220°, depending upon the rate of flow of water through the tube. If the force is less, pattern spraying can be obtained over areas away from an arc of from 90° to 220°.

As before mentioned, I believe that the above explanation is why the tube will bend at the cap 12, then assume a horizontal position, then near the end assume nearly a vertical position, and only swing through an arc of from 90° to 220°.

In building many of these sprinklers, I have found that this is the way the sprinkler works; and this form of sprinkler is especially adaptable when it is to be used up against the side of a house and it is desired to get a half-arc spray rather than a full arc spray.

It will be understood that when the water is first turned on, it will pass up through the opening 32 in the metering device M and then up into the piston 7 and will raise the piston 7 to its uppermost position, where the seal 11 will contact with the upper inner surface of the cap 12 to thus cause all the water thereafter to pass out through the tube 8.

Then the tube 8 will swing from side to side and assume the position as above explained. When the water pressure is turned off, of course, the weight of the piston 7 will pull the tube 8 back into the casing 1 and the tube then assume its normal, inoperative position.

Of course, it will be seen that water will pass out about the grooves of the tube 8 when the water is first turned on, and this is an advantage, as if the ground has been stepped on just above the sprinkler, this water will clear the opening so that the tube may easily be protracted, so that there is never any danger of the tube not being able to assume its protracted position.

By metering the amount of flow, I regulate the amount of swing of the tube, which is also an advantage; and, as heretofore mentioned, this is done by the size of the rubber metering device 29, and the size of its opening 32.

In Fig. 5 I have shown a slight modification, and this resembles in a great many respects the tube in the parental case; and it will be understood that the same metering device and piston are used, but I just cut off the upper end of the tube and make the tube without having any restricted end or tangential opening, and then the tube will swing in an arc, as shown in Fig. 8.

From the foregoing it will be seen that I have provided a sprinkler wherein when not in use the tube is in a retracted position, so that it will not be affected by a lawn mower or anything else. By restricting the end and forming a tangential opening, I can regulate the arc through which the sprinkler will swing; and if it is desired to have the sprinkler make a full revolution rather than a half revolution, it is only necessary to make a pair of shears and cut off the outer end of the tube, or, of course, regular tubes without restricted ends could be furnished.

With this form of sprinkler, the preferred and modified form, I can spray a large area; and I can also spray with ones that should only cover say 90° to 180°, so that the water would not be wasted up against the wall of the house, or fly out over the sidewalk. The sprinkler could be used, of course, as well on lawns, baseball diamonds, football fields, or other places where it would not be feasible to have a large metal spraying cap 1½" or 2" in diameter, that is now conventional in use on lawn sprinklers.

As heretofore mentioned, the metering device in itself is not new, but I do believe that it is new to put it in the piston in which there is secured a tube with spiral grooves on its outer surface so that regardless of the fluctuation in the water pressure, the tube will spray over a certain desired area; and, furthermore, by regulating the amount of pressure that passes through the sprinkler, the size of the horizontal arc can be predetermined.

Having thus described my invention, what I claim is new and desire to secure by Letters Patent is:

1. In a lawn sprinkler a casing having internal vertical guides extending throughout the greater length of the casing, a weighted piston loosely mounted therein and having a central aperture therethrough, a water metering device located in the piston for regulating the amount of flow of water through the piston, means on the piston cooperating with the aforementioned guides for preventing the turning of the piston within the casing, a flexible rubber tube secured to the upper end of the said piston and provided with spiral grooves on its outer circumference and substantially throughout its length, the flexible tube sealed at its outer end and provided with an opening slightly below the sealed upper end to form a resultant pocket, the opening extending at substantially right angles to the central axis of the tube and in a direction away from the central casing so the water will be thrown or sprayed away from the sprinkler; a valve closure near the upper end of the piston, an inlet pipe extending within the bottom of said casing, a top for the casing provided with a central orifice of slightly greater internal diameter than the outside diameter of the tube, the bottom of the cap acting as a valve seat, the valve closure being less in outside diameter than the inside diameter of the casing; the piston and rubber tube adapted to rise in the casing when water is admitted through the casing and to flow around the valve closure and through the aperture in the cap until the piston reaches its full height when the valve closure will press against the aforementioned valve seat and prevent the water from going out through the opening in the cap around the tube to thereby cause the water to flow only through the rubber tube, and due to the spiral grooves about the tube, the resultant pocket in the closed-off end of the tube and the opening slightly below the pocket, it will cause the tube to bend at substantially right angles where it projects through the cap, extending in a horizontal direction for the greater part of its length, and then assume nearly a vertical position; and the size of the arc in which the tube will swing being dependent upon the amount of flow of water through the metering device.

2. In a lawn sprinkler a casing having internal vertical guides extending throughout the greater length of the casing, a weighted piston loosely mounted therein and having a central aperture therethrough, a water metering device located in the piston for regulating the amount of the flow of water through the piston, means on the piston cooperating with the aforementioned guides for preventing the turning of the piston within the casing; a flexible rubber tube secured to the upper end of the said piston and provided with spiral grooves on its outer circumference and substantially throughout its length, the flexible tube sealed at its outer end and provided with a pear-shaped opening slightly below the sealed upper end to form a resultant pocket, the said opening extending at substantially right angles to the central axis of the tube and in a direction pointing away from the central casing so that the water will be thrown or sprayed away from the sprinkler; a valve closure near the upper end of the piston, an inlet pipe extending within the bottom of said casing, a top for the casing provided with a central orifice of slightly greater internal diameter than the outside diameter of the tube, the bottom of the cap acting as a valve seat, the valve closure being less in outside diameter than the inside diameter of the casing; the piston and rubber tube adapted to rise in the casing when water is admitted through the casing and to flow around the valve closure and through the aperture in the cap until the piston reaches its full height when the valve closure will press against the aforementioned valve seat and prevent the water from going out through the opening in the cap around the tube to thereby cause the water to flow only through the rubber tube, and due to the spiral grooves about the tube, the resultant pocket in the closed-off end of the tube and the pear-shaped opening slightly below the pocket, it will cause the tube to bend at substantially right angles where it projects through the cap, extending in a horizontal direction for the greater part of its length, and then assume nearly a vertical position;

and the size of the arc in which the tube will swing being dependent upon the amount of flow of water through the metering device.

References Cited in the file of this patent

UNITED STATES PATENTS

| | | |
|---|---|---|
| 1,821,579 | Rader | Sept. 1, 1931 |
| 1,906,621 | Knuth | May 2, 1933 |
| 2,613,993 | Holden | Oct. 16, 1952 |

FOREIGN PATENTS

| | | |
|---|---|---|
| 132,977 | Australia | June 1, 1949 |